US006334522B2

(12) United States Patent
Haruta et al.

(10) Patent No.: US 6,334,522 B2
(45) Date of Patent: Jan. 1, 2002

(54) CONTROL APPARATUS FOR PASSENGER CONVEYOR AND PASSENGER DETECTING DEVICE

(75) Inventors: Yasumasa Haruta; Yoshiki Sugiyama; Haruhiko Nakamura; Akio Iwata, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/738,840

(22) Filed: Dec. 18, 2000

Related U.S. Application Data

(63) Continuation of application No. PCT/JP99/02551, filed on May 17, 1999.

(51) Int. Cl.[7] .................................................. B65G 43/00
(52) U.S. Cl. .......................................................... 198/322
(58) Field of Search .................................... 198/322, 323

(56) References Cited

U.S. PATENT DOCUMENTS 4,748,394 A 5/1988 Watanabe ..................... 318/807
5,782,330 A * 7/1998 Mehlert et al. ............... 198/322
5,923,005 A * 7/1999 Blondiau et al. ............. 198/322

FOREIGN PATENT DOCUMENTS

| | | | |
|---|---|---|---|
| JP | 62-275990 | 11/1987 | |
| JP | 281288 | * 11/1989 | ................... 198/322 |
| JP | 2291390 | * 12/1990 | ................... 198/322 |
| JP | 6-87592 | 3/1994 | |
| JP | 10-182050 | 7/1998 | |

* cited by examiner

*Primary Examiner*—Joseph E. Valenza
(74) *Attorney, Agent, or Firm*—Leydig, Voit & Mayer, Ltd.

(57) ABSTRACT

In a control apparatus for a passenger conveyor, passenger detecting devices provided on balustrades distinguish and monitor the absence/presence of a passenger within first zones on an entrance gate side and an exit gate side including floor boards of the entrance gate side and the exit gate side, and the absence/presence of a passenger within second zones on the entrance gate side and the exit gate side adjacent to and beyond the first zones, covering the first zones. When a passenger is detected in the second zone on the entrance gate side in a standby mode, a mode switching circuit switches the operating mode to an intermediate mode, and when a passenger is detected in the first zone on the entrance gate side in the intermediate mode, the mode switching circuit switches the operating mode to a conveying mode.

14 Claims, 12 Drawing Sheets

CONTROL APPARATUS FOR PASSENGER CONVEYOR AND PASSENGER DETECTING DEVICE

CROSS REFERENCE TO RELATED APPLICATION

This is a continuation of International Application PCT/JP99/02551, with an international filing date of May 17, 1999, the contents of which are hereby incorporated by reference into the present application.

BACKGROUND OF THE INVENTION

1. Field of the Invention

The present invention relates to a passenger conveyor such as an escalator or a moving walk. More particularly, the invention relates to a control apparatus for a passenger conveyor in which a plurality of operating modes including a conveying mode for operating at a speed at which passengers are conveyed and a standby mode for standing by while reducing power consumption are automatically switched, and a passenger detecting device which is applicable to such a control apparatus.

2. Description of the Related Art

Conventionally, in a stopping automatic operating system passenger conveyor, sensors are provided on poles provided at an entrance gate. The conveyor is in standby with the operation thereof stopped when no passengers are detected and the conveyor is operated at a rated speed when a passenger is detected by the sensors.

The JEAS-410A of the Japanese Elevator Society standards define such a stopping automatic operating system as follows:

1. A detection point should be provided that has a sufficient distance for the escalator so that the escalator may be started and reach a rated velocity before the user rides on the escalator. This distance is 1.0 m or more (corresponding to about 1.7 m from a comb portion) from the ends of the returning portions of the moving handrails at both the entrance and exit gates. (The walking speed of the passenger is 1.5 m/sec and the passenger conveyor reaches the rated velocity in 0.5 to 0.8 sec after the start.)

2. operation should continue for a longer period of time than it takes the user who last rides on the conveyor to arrive at the exit gate.

3. The operating direction should be one way.

4. An alarm should be sounded for a person who rides from the reverse direction, and at the same time the conveyor should be moved in the opposite direction (i.e., the regular operating direction) for a set period of time.

5. Railings should be provided between the passenger detection position and the entrance/exit gates for guiding the users.

6. A display showing “automatic operation” and acceptance or rejection of a passenger should be provided (i.e., showing the operating direction) at both entrance/exit gates.

Also, European Regulations EN115 stipulate as follows:

1. The conveyor should start to move before the pedestrian rides on a step. (A photoelectric device should be installed 1.3 m away from the comb.)

2. A display showing the operating direction and acceptance/rejection is required.

3. The conveyor should move in the opposite direction before pedestrian who is going to ride in the wrong direction rides on the step.

4. The period of time for this operation should be 10 sec or more.

Accordingly, in the stopping automatic operating system passenger conveyor, it is necessary to provide additional equipment such as poles, an automatic operation display lamp, an operating direction display lamp and guide railings. Among such additional equipment, the poles are located at a distance of 1.0 m or more from the handrail returning portions with the sensors being built therein. Also, the automatic operation display lamp indicates the movement of the conveyor if the user is close thereto while the passenger is stopped. The operating direction display lamp indicates the regular set operating direction while the passenger conveyor is stopped and displays whether the riding direction is a regular direction or an opposite direction. In some cases, these display lamps are built into the poles.

Also, the guide railings are used to prevent the user from riding on the passenger conveyor without passing through the detecting device, and, at the same time, prevent the user from moving aside without riding on the passenger conveyor after being detected by the detecting device.

A so-called low speed automatic operating system can also be provided in contrast to the above-described stopping automatic operation system.

For example, Japanese Patent Application Laid-Open No. Sho 62-275990 shows a control method in which a passenger conveyor stands by at a low speed operation, is accelerated in accordance with a detection signal of a passenger detection device, and is again decelerated after a predetermined period of time.

Also, Japanese Patent Publication No. Hei 5-5572 discloses a method in which after a passenger conveyor has been accelerated from a low speed operation by a VVVF inverter, the drive source is switched over to a commercial power source to thereby perform a rated speed operation.

In such low speed automatic operating systems, since low speed operation is continued even during standby conditions, it is possible to omit or simplify the automatic operation display lamps or operating direction display lamps. Also, in the case where the passenger conveyor is gradually accelerated by the inverter, even if a passenger were to ride on the conveyor during the acceleration operation, it is very unlikely that the passenger would fall down. Accordingly, it is possible to place the passenger detection positions just before the passenger entrance and exit gates. It is therefore possible to dispense with the guide railings and easily incorporate the passenger detection device into the passenger conveyor.

However, the energy saving effect in the low speed automatic operating system is degraded compared with the stopping system because low speed operation is performed even during the standby condition.

In contrast, Japanese Patent Application Laid-Open No. Sho 57-72581 and Japanese Patent Application Laid-Open No. Sho 61-162485 disclose a control method in which if no passengers are detected for a predetermined period of time while the passenger conveyor is standing by at low speed operation, operation is stopped and the conveyor stands by. However, in this case, since the conveyor is stopped for the standby mode when it is not busy, as in the stopping automatic operating system, it is necessary to provide the automatic operation display lamps and the operating direction display lamps.

In addition, Japanese Patent Application Laid-Open No. Sho 55-161770, Japanese Patent Application Laid-Open No. Sho 64-14784 and Japanese Patent Application Laid-Open No. Hei 4-58582 disclose a control method in which the operating speed is changed in accordance with the absence/presence of passengers.

Also, Japanese Patent Application Laid-Open No. Sho 62-269882 discloses a control method in which, in accordance with an output from a device for detecting the number of the passengers per unit time, the low speed operation is performed when there is no-load and the rated speed operation is performed when the passengers are detected.

Furthermore, Japanese Patent Application Laid-Open No. Hei 1-281288 discloses a method in which sensors are arranged at an end portion of the handrail and the ceiling, respectively, and when a passenger is detected by either one of the sensors, operation is started.

Also, Japanese Patent Application Laid-Open No. Hei 3-243591 discloses a control method in which a first detecting device is provided at the entrance and exit gates and a second detecting device is provided in the vicinity of the comb portion so that the passenger conveyor is started by the first detecting device and a counting operation according to a timer is started with the second detecting device, the operation of the passenger conveyor being stopped after a predetermined period of time.

Further, Japanese Patent Application Laid-Open No. Hei 6-87592 discloses a control method in which photo sensors, each composed of a light emitting element and a light detecting element are provided on right and left handrail end portions, beams from the right and left light emitting elements are made to intersect one another at the entrance/exit gate, and when passenger is detected by both the right and left photo sensors, the passenger conveyor is started. Also, in this example, a plurality of pairs of photo sensors having different beam intersection positions are provided, and it is thus possible to detect the presence/absence of passengers within a wide range.

Furthermore, Japanese Patent Application Laid-Open No. Hei 10-182050 discloses a passenger monitoring device in which reflective light detection type photo sensors are provided on right and left handrails to monitor passengers on a floor board of the entrance/exit gate with the respective photo sensors.

As described above, the conventional stopping automatic operation system needs additional equipment such as poles, automatic operation display lamps, operating direction display lamps and guide railings. Also, the energy saving effect of the conventional low speed automatic operating system is low compared to the stopping because the low speed operation is performed during standby.

Also, Japanese Examined Patent Publication No. Sho 61-57274 discloses a passenger conveyor operating apparatus which comprises a transit passenger detecting device for detecting the absence/presence of a passenger before the entrance gate and a riding passenger detecting device for detecting the advance of the passenger to a step board of the entrance gate portion. A drive device is switched from suspended operation to low speed operation in accordance with a detection signal from the transit passenger detecting device, and the drive device is switched from low speed operation to regular speed operation in accordance with the detection signal from the riding passenger detecting device.

However, in this operating apparatus, the transit passenger detecting device is provided only on the side of the entrance gate and only an alighting passenger detecting device is provided on the exit gate. Also, the transit passenger detecting device is simply used for monitoring whether or not a transit passenger is present before the entrance gate portion. The detection range of the transit passenger detecting device is separate from the detecting range of the riding passenger detecting device. Accordingly, a passenger who cuts in from outside of the handrail returning portion to the entrance gate can not be detected.

Furthermore, since the transit passenger detecting device is disposed in the building where the passenger conveyor is installed, the installation work has to be performed independently of the installation work of the passenger conveyor. Also, the mounting position thereof is limited by the building itself, and as a result, the detection range is changed so that passengers cannot be detected with high precision.

SUMMARY OF THE INVENTION

In order to solve the above-described problems, an object of the present invention is to provide a passenger conveyor control apparatus that may improve the energy saving effect while simplifying auxiliary equipment and a passenger detecting apparatus which may be applied to such a control apparatus.

To this end, according to one aspect of the present invention, there is provided a control apparatus for a passenger conveyor comprising: a control apparatus body for controlling operation of the passenger conveyor in accordance with a plurality of operating modes including a standby mode for stopping operation for standby, an intermediate mode switched over from the standby mode, a conveying mode switched over from the intermediate mode for conveying a passenger and an alarm mode for alerting a passenger who is about to enter from an exit gate side that the conveyor is operating in the opposite direction; passenger detecting devices for distinguishing and monitoring the absence/presence of a passenger within first zones on an entrance gate side and the exit gate side, including floor boards of the entrance gate side and the exit gate side, and the absence/presence of a passenger within second zones on the entrance gate side and the exit gate side which is adjacent to outside of the first zones so as to cover the first zones, respectively; and a mode switching circuit for switching the operating modes in response to information from the passenger detecting devices, wherein in the case where a passenger is detected in at least one second zone on the entrance gate side and the exit gate side in the standby mode, the mode switching circuit switches the operating mode to the intermediate mode, in the case where a passenger is detected in the first zone on the entrance gate side in the intermediate mode, the mode switching circuit switches the operating mode to the conveying mode, and in the case where a passenger is detected in the first zone on the exit gate side in the intermediate mode, the mode switching circuit switches the operating mode to the alarm mode.

According to another aspect of the present invention, there is provided a control apparatus for a passenger conveyor comprising: a control apparatus body for controlling operation of the passenger conveyor in accordance with a plurality of operating modes including a conveying mode for conveying a passenger, a standby mode for stopping operation for standby, an intermediate mode switched over from the standby mode and an alarm mode for alerting a passenger who is about to enter from an exit gate side that the conveyor is operating in the opposite direction; a passenger detecting device for distinguishing and monitoring the absence/presence of a passenger within a first zone including a floor board of the exit gate side, and the absence/presence of a passenger within a second zone which is adjacent to outside of the first zone so as to cover the first zone; and a mode switching circuit for switching the operating mode to the intermediate mode in the case where a passenger is detected in the second zone in the standby mode, and the operating mode to the alarm mode in the case where a passenger is detected in the first zone in the intermediate mode.

According to a still further aspect of the present invention, there is provided a control apparatus for a passenger conveyor comprising: a control apparatus body for controlling operation of the passenger conveyor in accordance with a plurality of operating modes including a conveying mode for operating at a speed at which passengers are conveyed, a standby mode for standing by under a power consumption saving condition and an alarm mode for alerting a passenger who is about to enter from an exit gate side that the conveyor is operating in the opposite direction; passenger detecting devices for detecting a passenger adjacent to an entrance gate and the exit gate of the passenger conveyor; and a mode switching circuit for switching the operating modes in response to information from the passenger detecting devices, wherein structures of the passenger detecting devices on the entrance gate side and on the exit gate side and detection zones of the passenger detecting devices are the same as each other, and a control method on the entrance gate side and a control method on the exit gate side may be automatically switched with each other in response to a switching operation of the operating directions of the passenger conveyor.

According to a still further aspect of the present invention, there is provided a reflective light type passenger detecting device for a passenger conveyor, having a light emitting portion and a light receiving portion disposed in a balustrade portion of entrance and exit gates of the passenger conveyor for detecting the absence/presence of a passenger adjacent to the entrance and exit gates, wherein a light projection range of the light emitting portion and a light receiving range of the light receiving portion are sector-shaped as viewed from above, respectively, and wherein angles in an up-and-down direction of the light projection range and the light receiving range are changed so that a portion comprising the intersection of the light projection range and the light receiving range may be used as a detection range.

DETAILED DESCRIPTION OF THE PREFERRED EMBODIMENTS

Preferred embodiments of the present invention will now be described with reference to the drawings.

Embodiment 1

Figure 1:
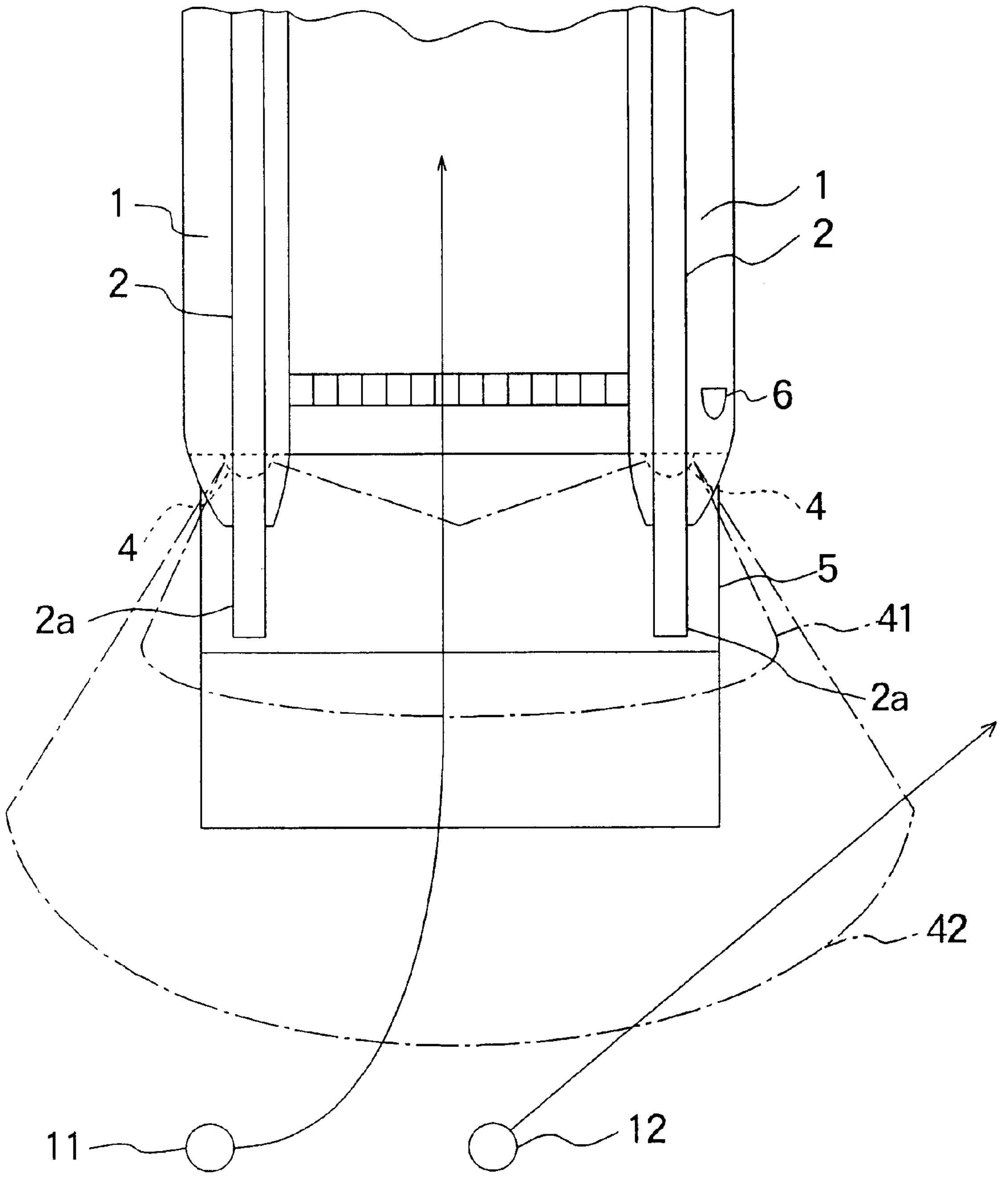
FIG. 1 is a plan view showing an entrance gate of a passenger conveyor in accordance with Embodiment 1 of the present invention.
Figure 2:
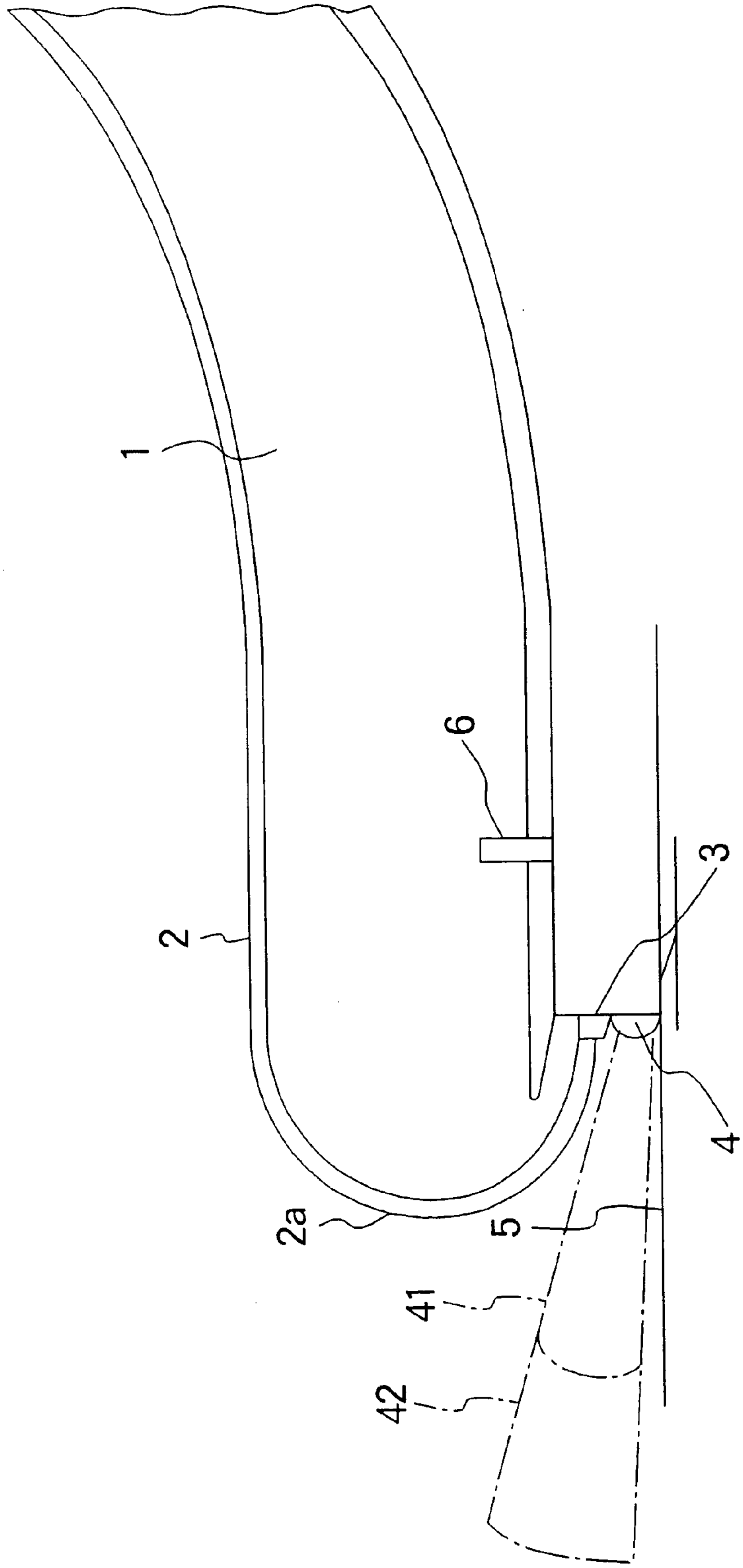
FIG. 2 is a side elevational view showing the entrance gate shown in FIG. 1.
Figure 3:
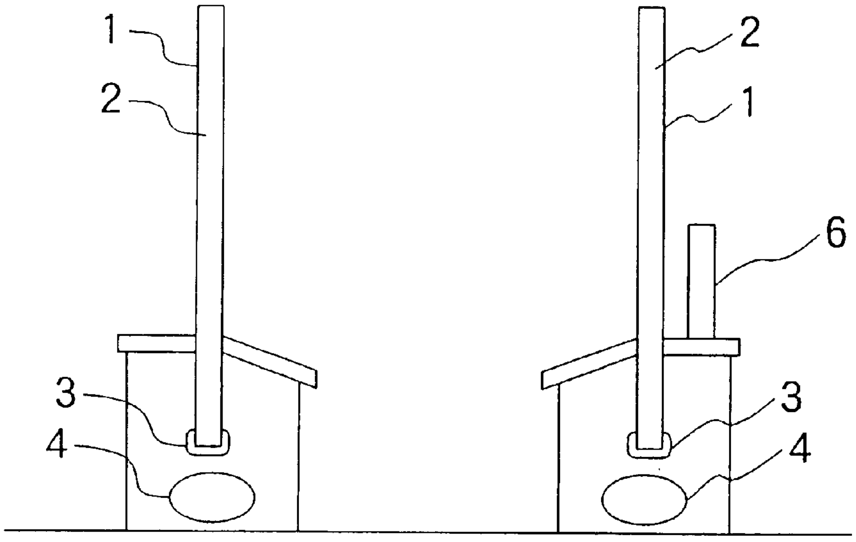
FIG. 3 is a front view showing the entrance gate shown in FIG. 1.

FIG. 1 is a plan view showing an entrance gate of a passenger conveyor in accordance with Embodiment 1 of the present invention, FIG. 2 is a side elevational view showing the entrance gate shown in FIG. 1, and FIG. 3 is a front view showing the entrance gate shown in FIG. 1.

In the drawings, moving handrails 2 are provided on a pair of balustrades 1, respectively. A passenger detecting device 4 for detecting absence/presence of a passenger is provided in a lower portion of a handrail return port 3 of each balustrade 1. For example, devices having reflective photo detection type sensors with light emitting portions and light receiving portions may be used as these passenger detecting devices 4. Also, devices having ultrasonic wave sensors may be used.

Moreover, the passenger detecting devices 4 monitor to distinguish the presence/absence of a passenger within a first zone 41 at the entrance gate side, including an entrance floor board 5, from the presence/absence of a passenger within a second zone 42 at the entrance gate side and adjacent to the outside of the first zone 41 so as to cover the first zone 41. The first zone 41 is a range in which the passenger is about to ride on the passenger conveyor from the i.e., a range slightly projecting from the handrail returning portions 2 at both sides.

The second zone 42 is wider than the first zone 41 in consideration of the approach path of passengers. The first zone 41 and the second zone 42 may partially overlap each other. For instance, the detection range of the passenger conveyor in the longitudinal direction is about 1.0 to 3.0 m from the handrail returning portions 2*a*. Also, the first and second zones 41 and 42 include a region outside of the handrail returning portion 2*a* on both sides of the passenger conveyor. Thus, it is possible to detect a passenger who detours around the entrance/exit gates from outside of the handrail returning portions 2*a*.

A display device 6 for showing the automatic operation display, operating direction display and the like is provided on a balustrade 1.

Figure 4:
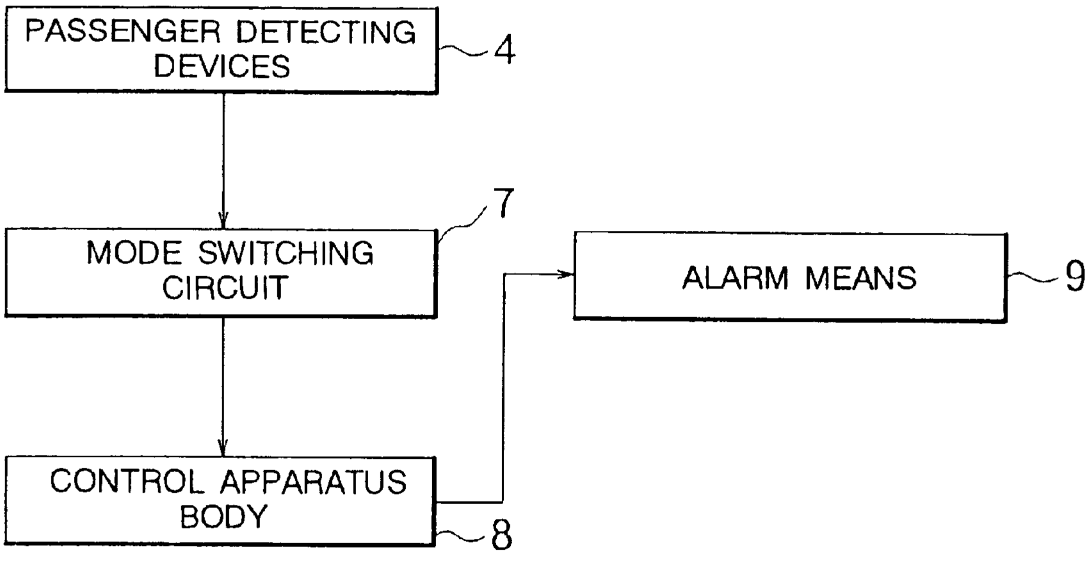
FIG. 4 is a block diagram showing a control apparatus for the passenger conveyor shown in FIG. 1.

FIG. 4 is a block diagram showing a control apparatus for the passenger conveyor shown in FIG. 1. A signal from the passenger detecting devices 4 is output to a mode switching circuit 7. The mode switching circuit 7 switches the operating modes of a control apparatus body 8 in response to information from the passenger detecting devices 4. The control apparatus body 8 controls operation of the passenger conveyor with a plurality of operating modes including a standby mode for stopping operation for standby, an intermediate mode that may be switched to from the standby mode, a conveying mode switched to from the intermediate mode for conveying the passenger, and an alarm mode for warning a passenger who is about to ride on the conveyor from the exit gate that the operating direction is in reverse.

More specifically, the mode switching circuit 7 switches the operating mode to the intermediate mode in the case where a passenger is detected in the second zone 42 on the entrance gate side in the standby mode, and switches the operating mode to the conveying mode in the case where the passenger is detected in the first zone 41 on the entrance gate side in the intermediate mode.

In the conveying mode, the passenger conveyor is operated at a rated speed for only a predetermined period of time (a period of time for passengers to be conveyed plus an additional period of time). Also, a sensor may be provided on the exit gate side so that the passenger conveyor is stopped in a predetermined time after the final passenger gets off.

In the intermediate mode, the passenger conveyor is operated at a lower speed than that of the conveying mode. Also, when operating in the intermediate mode, if a predetermined time (for example, 0 to 10 seconds) when no passengers are detected in the first zone 41 and the second zone 42 passes, the operating mode of the control apparatus body 8 is returned back to the standby mode.

Also, an alarm means 9 for alerting the passengers in the vicinity of the exit gate is connected to the control apparatus body 8. In the alarm mode, the alarm means 9 alerts passengers who are about to enter from the exit gate and informs them that the operating direction is opposite the reverse of their desired direction of travel. Also, the alarm mode may, for example, alert passengers that the operating direction is in reverse by running the passenger conveyor faster than the intermediate mode without using the alarm means 9.

Figure 5:
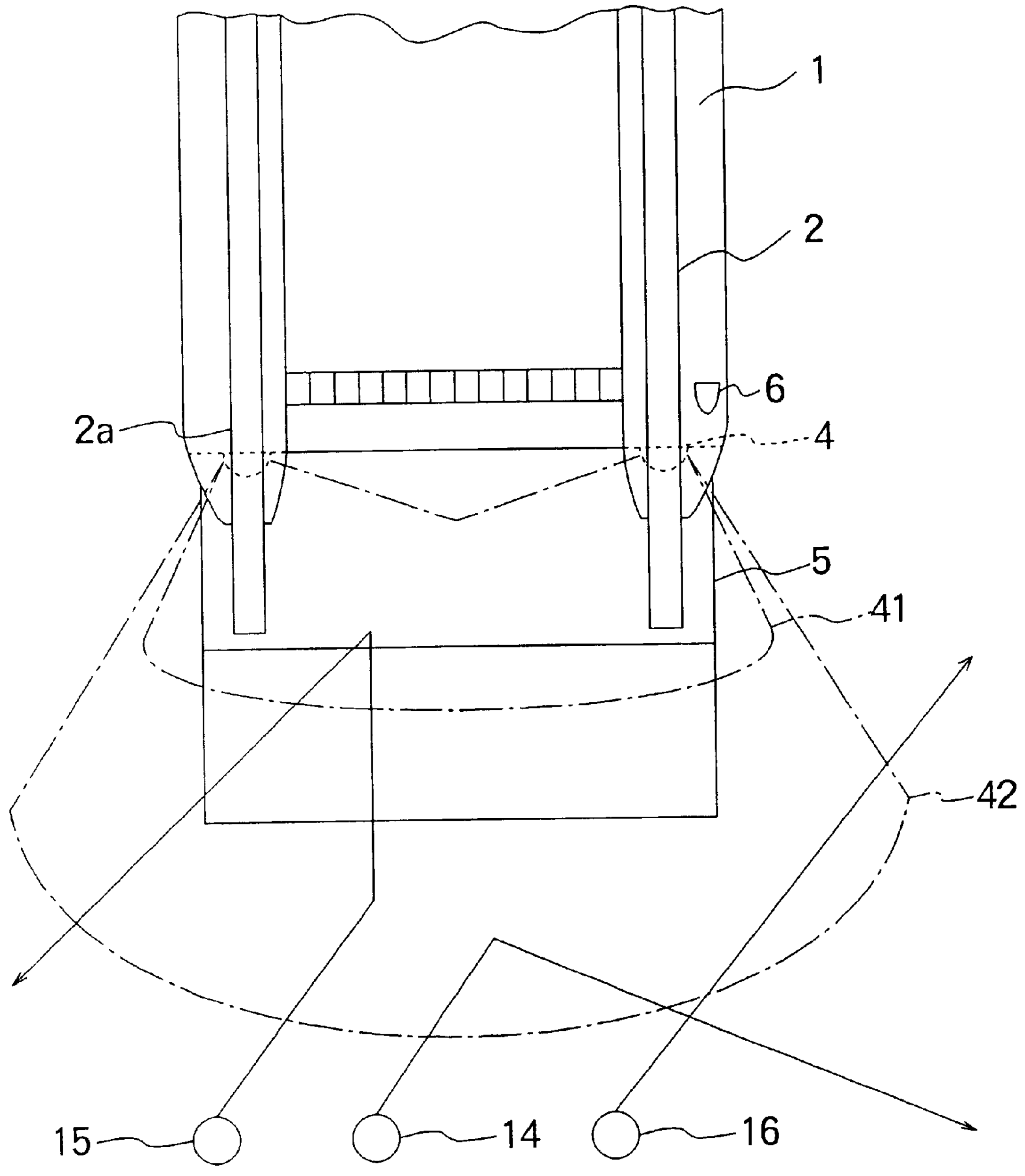
FIG. 5 is a plan view showing an exit gate of the passenger conveyor shown in FIG. 1.

As shown in FIG. 5, the passenger detecting devices 4 and the display device are provided at the exit gate of the passenger conveyor in the same manner as the entrance gate. The passenger detecting devices 4 detect the presence/absence of the passengers in the first and second zones 41 and 42 of the exit gate side at the exit gate as well.

The operation at the entrance gate side will now be described. In the case where no passengers ride on the passenger conveyor and no passengers are detected in the vicinity of the entrance/exit gates, the operating mode of the control apparatus body 8 is the standby mode, and operation of the passenger conveyor is stopped. In this condition, where a passenger 11 in FIG. 1 enters the passenger conveyor along the path indicated by the arrow, the operating mode is switched over to the intermediate mode when the passenger 11 enters the second zone 42 and the passenger conveyor starts low speed operation. Thereafter, when the passenger 11 enters the first zone 41, the operating mode is switched over to the conveying mode so that the passenger 11 is conveyed by the passenger conveyor.

Also, where a passenger 12 in FIG. 1 passes across the second zone 42 along the path indicated by the arrow, when the passenger 12 enters the second zone 42, the operating mode is switched to the intermediate mode so that the passenger conveyor is operated at low speed. However, after a predetermined period of time passes from when the passenger 12 leaves the second zone 42, the operating mode is returned back to the standby mode, and operation of the passenger conveyor is stopped.

Figure 6:
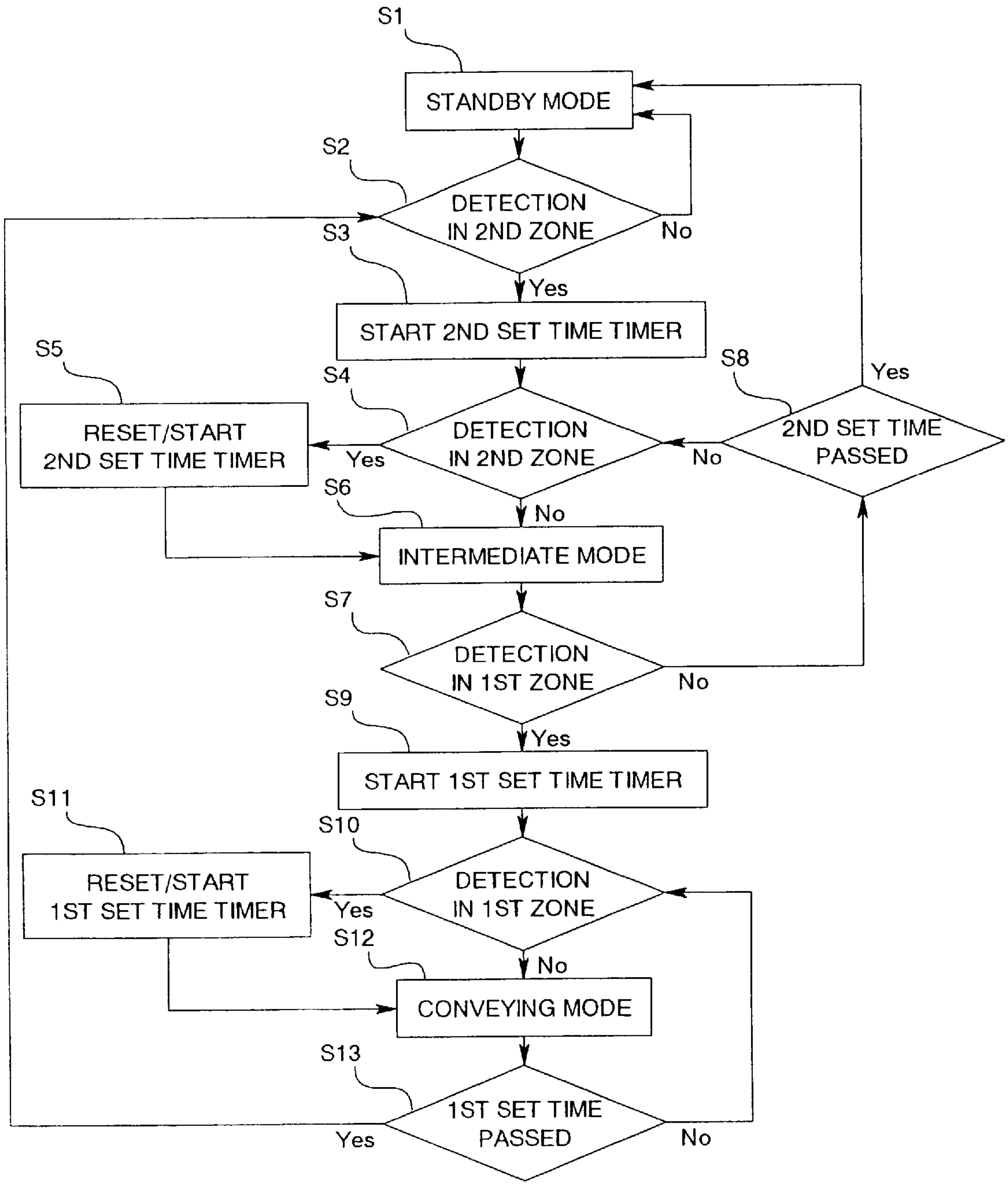
FIG. 6 is a flowchart for illustrating the operation of the control apparatus shown in FIG. 4 at the entrance gate side.

Here, FIG. 6 is a flowchart illustrating the operation of the entrance gate side of the control apparatus shown in FIG. 4. The operating mode during standby is the standby mode (step S1). The operation of the passenger conveyor is stopped, and the absence/presence of a passenger within the second zone 42 is monitored (step S2). Unless a passenger is detected within the second zone 42, the operating mode remains in the standby mode.

When a passenger is detected within the second zone 42, a timer for a second set time (for example, ten seconds) is started (step S3), and the absence/presence of a passenger within the second zone 42 is monitored (step S4). At this time, if a passenger is detected, after the timer for the second set time is reset and started (step S5), the operating mode is switched over to the intermediate mode (step S6). If a passenger is not detected, the timer is not reset and the operating mode is switched over to the intermediate mode (step S6).

During low speed operation in the intermediate mode, the absence/presence of the passenger within the first zone 41 is monitored (step S7). Consequently, unless a passenger is detected within the first zone 41, the counting operation of the timer confirms whether or not the second set time passes (step S8). Then, unless the second set time passes, the intermediate mode is continuously maintained, and the absence/presence of the passengers within the first and second zones 41 and 42 is monitored (steps S4 to S7). Also, if the second set time passes while no passengers are detected in the first and second zones 41, 42, the operating mode is returned back to the standby mode (step S1).

On the other hand, during low speed operation in the intermediate mode, if a passenger is detected in the first zone 41, a timer for a first set time (a time in excess of the time needed to convey a passenger) is started (step S9). Furthermore, the absence/presence of a passenger within the first zone 41 is monitored (step S10). At this time, when a passenger is detected, after the timer for the first set time is reset and started (step S11), the operating mode is switched over to the conveying mode (step S12). Moreover, if a passenger is not detected, the timer is not reset and the operating mode is switched over to the conveying mode (step S12).

When the rated speed operation in the conveying mode is started, the counting operation of the timer confirms whether or not the first set time passes (step S13). Then, until the first set time passes, the absence/presence of the passenger within the first zone 41 is monitored (step S10). Also, if the first set time passes while a new passenger is not detected within the first zone 41, the absence/presence of the passenger within the second zone 42 is monitored (step S2). Unless the passenger is present in the second zone 42, the operating mode is returned back to the standby mode (step S1).

The operation on the exit gate side will now be described. In the case where a passenger is detected in the second zone 42 on the exit gate side in the standby mode, the mode switching circuit 7 switches the operating mode to the intermediate mode. In the case where the passenger is detected in the first zone 41 on the exit gate side in the intermediate mode, the mode switching circuit 7 switches the operating mode to the alarm mode so that the alarm is generated by the alarm means 9.

In the alarm mode, the passenger conveyor is operated at the rated speed in the regular direction. However, if the predetermined time (for example, 3 to 10 seconds) when no passengers are detected the first zone 41 and the second zone passes, the operating mode of the control apparatus body 8 is returned back to the standby mode.

In the case where a passenger 14 shown in FIG. 5 enters the second zone 42 on the exit gate side in the standby mode, the operating mode is switched over to the intermediate mode. Thus, the low speed operation of the passenger conveyor is started in the regular direction. Thus, the passenger 14 can recognize that he was about to enter in the opposite direction and moves away from the exit gate as indicated by the arrow.

However, when a passenger 15 having entered the second zone 42 on the exit gate side, further enters the first zone 41 on the exit gate side without recognizing the low speed operation, the operating mode is switched over to the alarm mode in which the alarm is generated from the alarm means 9 and the passenger conveyor is operated at the rated speed. Thus, the passenger 15 can recognize that he was about to enter in the opposite direction and moves away from the exit gate as indicated by the arrow.

Also, in the case where a passenger 16 shown in FIG. 5 passes across the second zone 42 on the exit gate side along the path indicated by the arrow, the operating mode is switched over to the intermediate mode and the passenger conveyor is operated at the low speed when the passenger 16 enters the second zone 42. However, after the set time passes from when the passenger 16 has leaves the second zone 42, the operating mode is returned back to the standby mode and operation of the passenger conveyor is stopped.

With such a control apparatus for the passenger conveyor, since the operation is stopped in the standby mode, it is possible to obtain a high energy saving effect compared to a system which stands by at low speed.

Also, since the low speed operation is started when the passenger reaches a position somewhat away from the entrance or exit gate, it is possible to prevent passengers from wrongly believing that the passenger conveyor is stopped. Furthermore, passengers may observe and confirm the operating direction when they enter the second zone 42. Accordingly, it is possible to use a relatively simplified display device 6 such as the automatic operation display lamp or the operating direction display lamp. Moreover, it is also possible to mount the device on a design element such as the balustrade 1.

Furthermore, when a passenger has passed across the second zone 42 like the passenger 12 in FIG. 1 and the passenger 16 in FIG. 5, it is possible to suppress the energy loss for starting because the low speed operation is temporarily performed.

Also, since the first and second zones 41 and 42 include the region outside of the handrail returning portions 2*a* on both sides, it is possible to detect a passenger who takes a detour to the entrance or exit gate from outside of the handrail returning portions 2*a* and to dispense with the guide railings.

Further, since the passenger detecting devices 4 having the reflective photo detection system sensors are provided in the balustrade 1, it is unnecessary to provide equipment such as poles to incorporate the sensors.

Furthermore, riding in the wrong direction can be prevented by alerting the passenger even though the passenger conveyor stays in the standby mode, thus making it possible to obtain a high energy saving effect.

Also, since the ranges of the first and second zones 41 and 42 on the entrance and exit gate sides are the same, the structural elements for the passenger detecting devices 4 in the entrance and exit gates may be commonly used. It is therefore possible to facilitate maintenance and adjustment work and the like.

Embodiment 2

Figure 7:
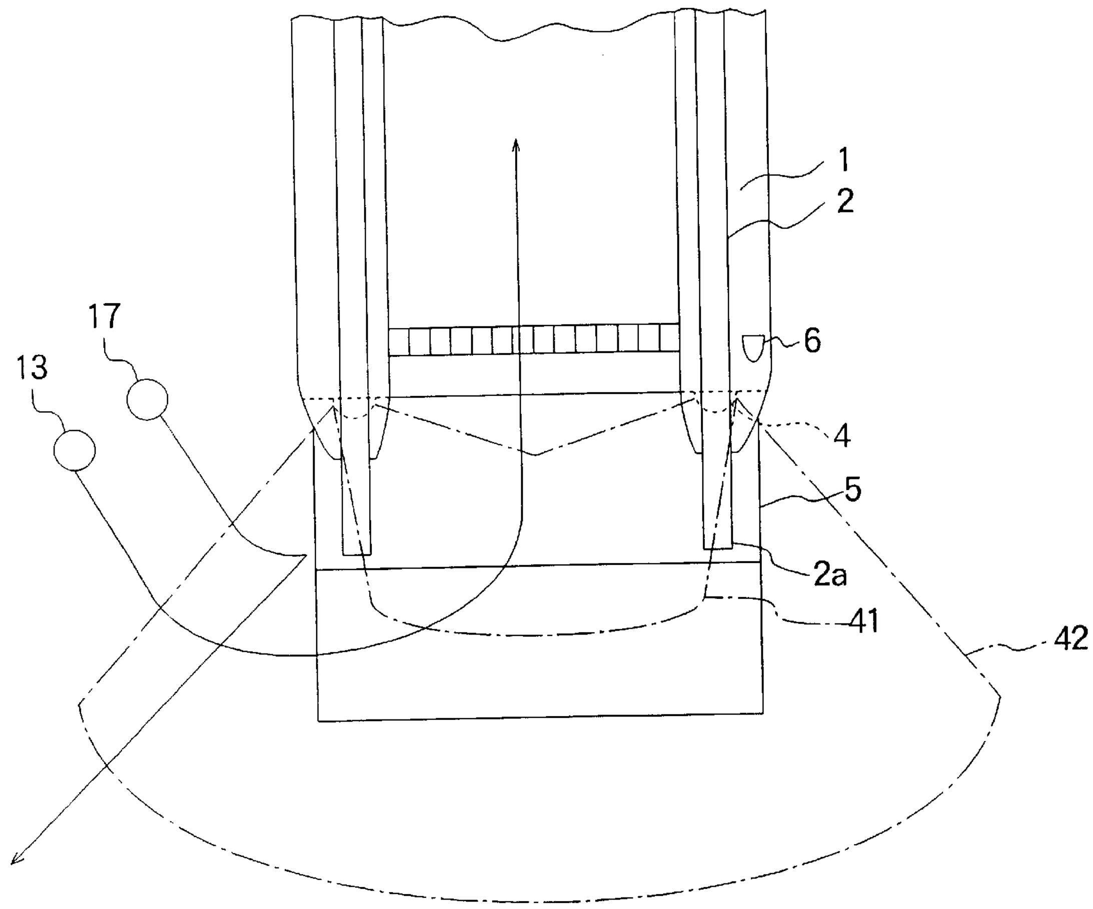
FIG. 7 is a plan view showing an entrance/exit gate of a passenger conveyor in accordance with Embodiment 2 of the present invention.

Furthermore, the first and second zones 41 and 42 on the entrance and exit gate sides are not limited to those shown in FIG. 1. For example, as shown in FIG. 7, the first zone 41 may be narrowed and the second zone 42 may be widened. By taking such detection ranges, it is possible to more positively detect passengers who detour around the entrance gate from outside of the handrail returning portions 2*a*, like the passenger 13 shown in FIG. 7. Moreover, at the exit gate, it is also possible to notify a passenger who takes a detour around the exit gate from outside of the curved handrail portions 2*a*, like passenger 17, that he is about to ride in the wrong direction by the low speed operation of the intermediate mode, and thereby prevent the passenger from riding in the wrong direction.

Also, in such a case, a first sensor (not shown) for detecting the absence/presence of the passenger within the first zone 41 and a second sensor (not shown) for detecting the absence/presence of the passenger within the second zone 42 are provided in the passenger detecting devices 4. It is sufficient that the angles of the first and second sensors are set to be different from each other, and it is possible to set the detection ranges as desired.

Embodiment 3

Figure 8:
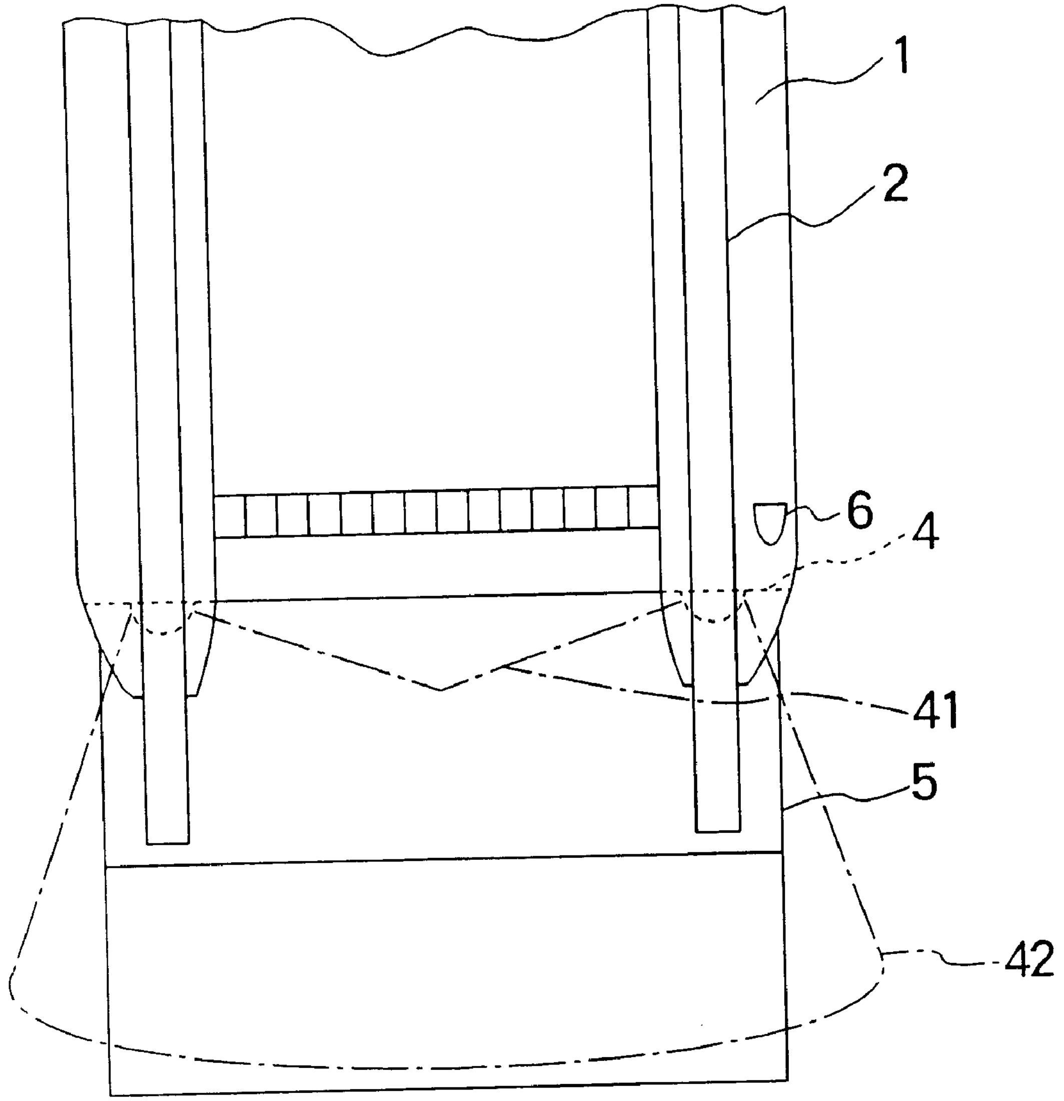
FIG. 8 is a plan view showing an entrance/exit gate of a passenger conveyor in accordance with Embodiment 3 of the present invention.

Furthermore, by changing the mounting angle of the passenger detecting devices 4 to direct the detection range in a specific direction or adjust the sensitivity thereof in accordance with environmental conditions or passenger traffic, it is possible to reduce the detection ranges as shown in, for example, FIG. 8.

Embodiment 4

Figure 9:
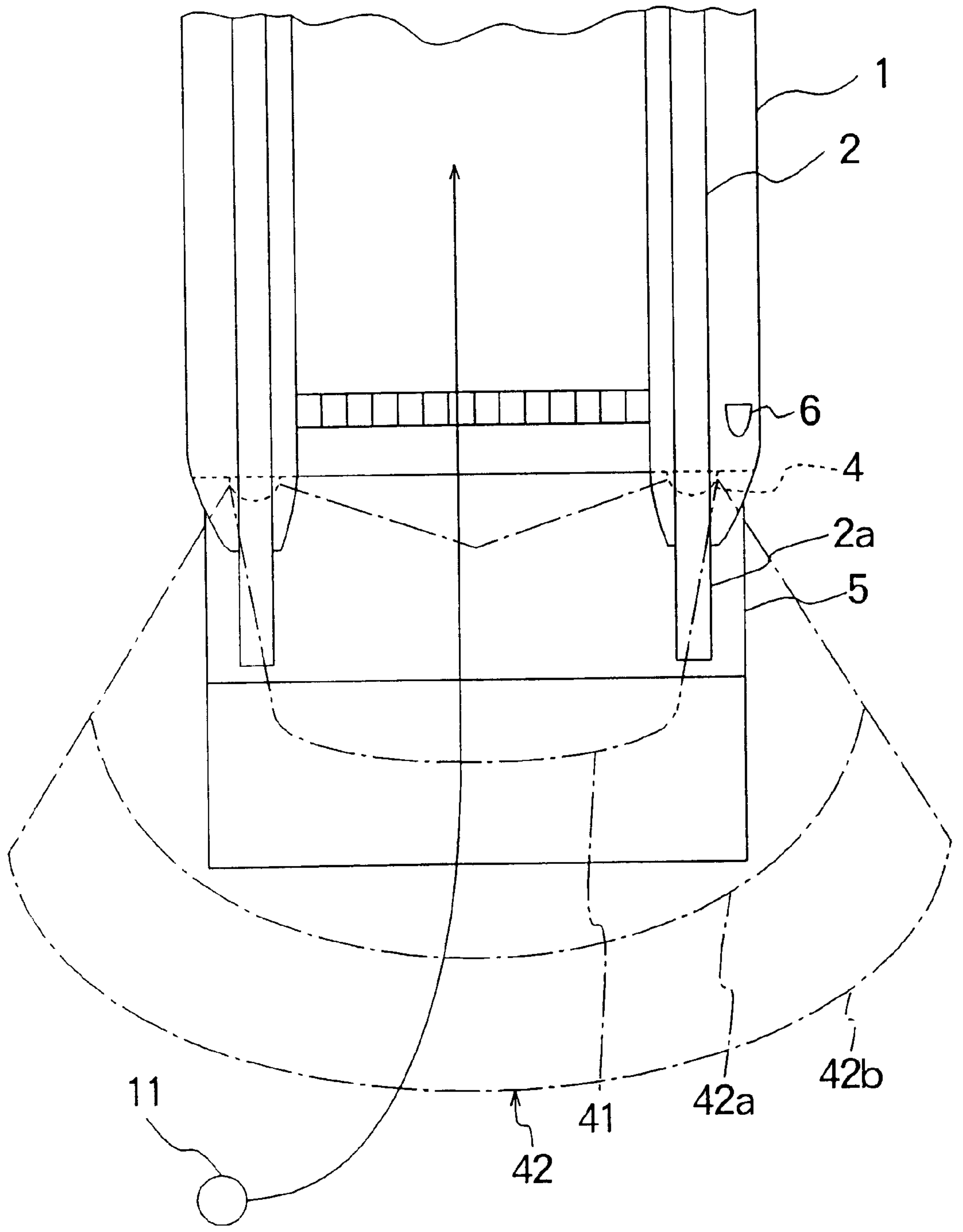
FIG. 9 is a plan view showing an entrance/exit gate of a passenger conveyor in accordance with Embodiment 4 of the present invention.

FIG. 9 is a plan view showing the entrance gate of the passenger conveyor in accordance with Embodiment 4 of the present invention. The passenger detecting devices 4 of this example monitor the presence/absence of passengers by dividing the second zone 42 on the entrance gate side into two different sub-zones 42*a* and 42*b* which have a different distance from the entrance/exit gates. The operating speed of the passenger conveyor when the passenger is detected within each sub-zone 42*a*, 42*b* such that the speed closer to the rated speed in the conveying mode in the sub-zone closer to the entrance/exit gates. Other structures are identical to Embodiment 1.

In such a control apparatus for the passenger conveyor, since the operating speed of the passenger conveyor is increased stepwise as passenger 11 approaches the entrance gate, it is possible to smoothly accelerate the passenger conveyor from the stopped condition to the rated speed.

Moreover, in this example, the second zone 42 on the entrance gate side is divided into the two sub-zones 42*a* and 42*b* but it may also be divided into three or more sub-zones.

Also, in the passenger conveyors shown in accordance with Embodiments 1 to 4, since the entrance gate and the exit gate are switched with each other by changing the operating direction, it is possible to automatically replace the control method on the entrance gate side and the control method on the exit gate side with the control apparatus body 8 in response to the operating direction.

In this case, the display contents of the display devices 6 may be automatically switched between the entrance gate side (the automatic operation display or the enter direction arrow or the like) and the exit gate side (do not enter display or the like). Also, if the first and second zones 41 and 42 are the same on the entrance gate side and the exit gate side, it is easy to switch the control methods therebetween.

Further, in Embodiment 1, in the alarm mode, the alarm is generated and at the same time the operating speed is accelerated to the rated speed. However, it is possible to only generate the alarm while keeping the operating speed at the low speed without any change. Furthermore, in Embodiment 1, in the intermediate mode in the case where the passenger is detected within the second zone 42 on the exit gate side, the passenger conveyor is operated at the low speed. However, it is possible to perform the operation at the rated speed.

Here, the relationship between the zone detection and the operating speed of the passenger conveyor to the movement of the passenger is as follows. In this example, the low speed operating velocity is 7.5 m/min and the rated speed is 30 m/min. Also, if the machine length of the passenger conveyor is 10 m, then the set time in the conveying mode is 30 seconds in with extra time added to the normal passage time of 20 seconds at the rated speed.

First, for the passenger who enters the first zone 41 from the second zone 42 on the entrance gate side and leaves the first zone 41 to enter the second zone 42 on the exit gate side, i.e., the general user, since the presence/absence of the passenger is disregarded at the exit gate during the set time of the conveying mode, the passenger detection condition is changed from X, through the second zone on the entrance gate side and the first zone on the entrance gate side to X. In response to this, the operating speed of the passenger conveyor is changed from 0 to 7.5 to 30 (about 30 seconds) to 0.

Also, for the passengers who passe only across the second zone 42 on the entrance gate side, the detection condition is changed from X through the second zone on the entrance gate side to X. The operating speed is changed from 0 to 7.5 (about 5 seconds) to 0.

Further, for passengers who passe only across the second zone 42 on the exit gate side, the detection condition is changed from X through the second zone on the exit gate side to X. The operating speed is changed from 0 through 7.5 (about 5 seconds) to 0.

Furthermore, for passengers who enter the first zone 41 from the second zone 42 on the exit gate side, recognizes that he is about to ride in the wrong direction and moves from the second zone 42 on the exit gate side to outside of the second zone 42, the detection condition is changed from X to the second zone on the exit gate side to the first zone on the exit gate side to the second zone on the exit gate side and then to X. The operating speed is changed from 0 to 7.5 to 30 (+alarm) to 7.5 (about 5 seconds) and to 0.

Embodiment 5

Figure 10:
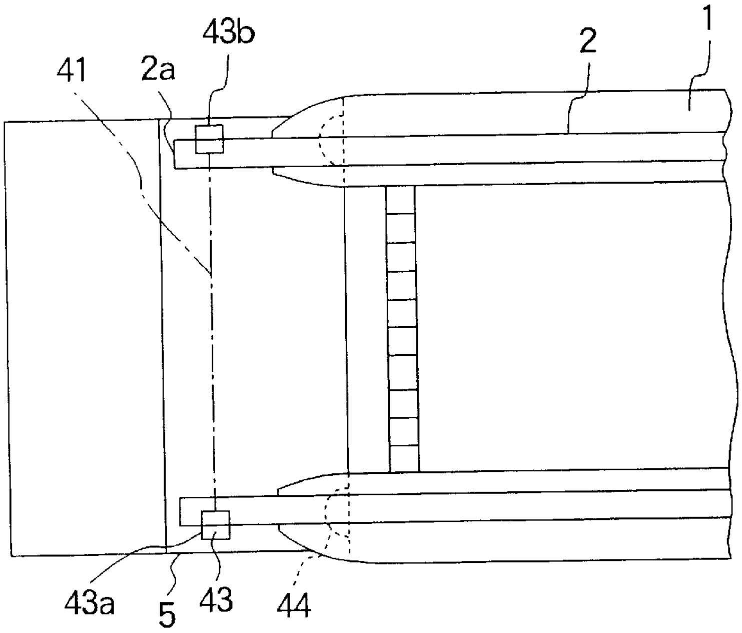
FIG. 10 is a plan view showing an entrance gate of a passenger conveyor in accordance with Embodiment 5 of the present invention.
Figure 11:
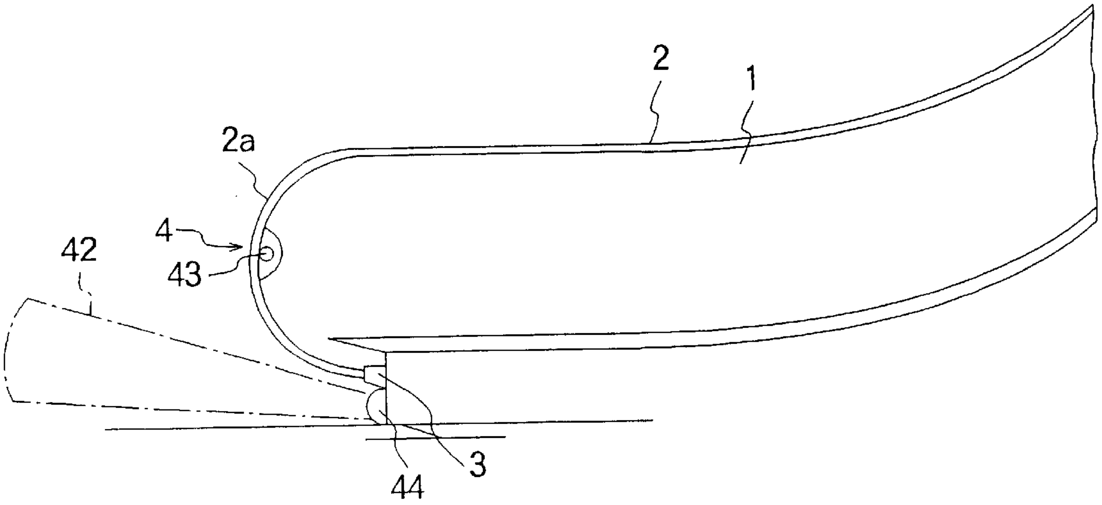
FIG. 11 is a side elevational view showing the entrance gate shown in FIG. 10.

FIG. 10 is a plan view showing an entrance gate of the passenger conveyor in accordance with Embodiment 5 of the present invention, and FIG. 11 is a side elevational view showing the entrance gate shown in FIG. 10. In this example, the passenger detecting devices 4 having a first sensor 43 for detecting the first zone 41 and a second sensor 44 for detecting the second zone 42 are used. An input photo detection type sensor having a light emitting portion 43*a* and a light receiving portion 43*b* facing each other and mounted at end portions of the balustrade 1 is used as the first sensor 43. The reflective photo detection type sensor is used as the second sensor 44 in Embodiment 1. Structures other than the above are the same as in Embodiment 1.

In such a control apparatus for the passenger conveyor, the passenger passes across the space between the light emitting portion 43*a* and the light receiving portion 43*b* of the first sensor 43 so that the light input beam to the light receiving portion 43*b* is interrupted. It is thus possible to more positively detect that the passenger has entered the first zone 41.

Moreover, it is possible to use passenger detecting devices that move the ranges of the first and second zones to the right and left to enlarge or reduce them. Thus, the first and second zones may be readily adjusted in response to the conditions of the entrance/exit gates of the passenger conveyor. Also, the sensitivity of the sensors of the passenger detecting devices may be adjustable.

Further, the acceleration/deceleration of the passenger conveyor may be performed more moderately in accordance with the inverter control. Thus, it is possible to operate the passenger conveyor more safely and quietly.

Here, the acceleration (or deceleration) of the passenger conveyor may be set so that passengers will not fall down. For example, if the acceleration (or deceleration) is about 0.01 G to 0.02 G (0.1 to 0.2 sec/$m^2$), and the rated speed is 30 m/min, it takes about 2.5 to 5 seconds to accelerate the passenger conveyor from the stop condition to the rated speed. In contrast, if the transiting speed is 1.5 m/sec, since the passenger conveyor advances 3.8 m to 7.5 m in 2.5 to 5 seconds, after the first passenger rides thereon safely at the rated speed or lower, the passenger conveyor may be smoothly accelerated up to the rated speed.

Embodiment 6

Figure 12:
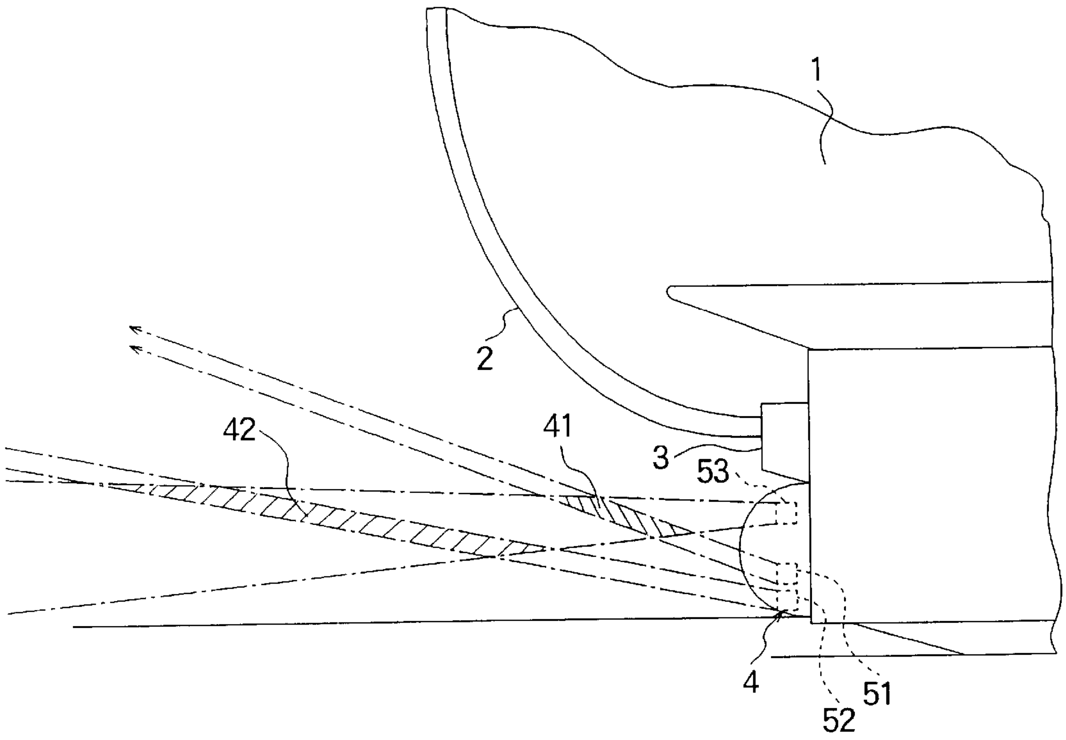
FIG. 12 is a side elevational view showing a passenger detecting device for the passenger conveyor in accordance with Embodiment 6 of the present invention.
Figure 13:
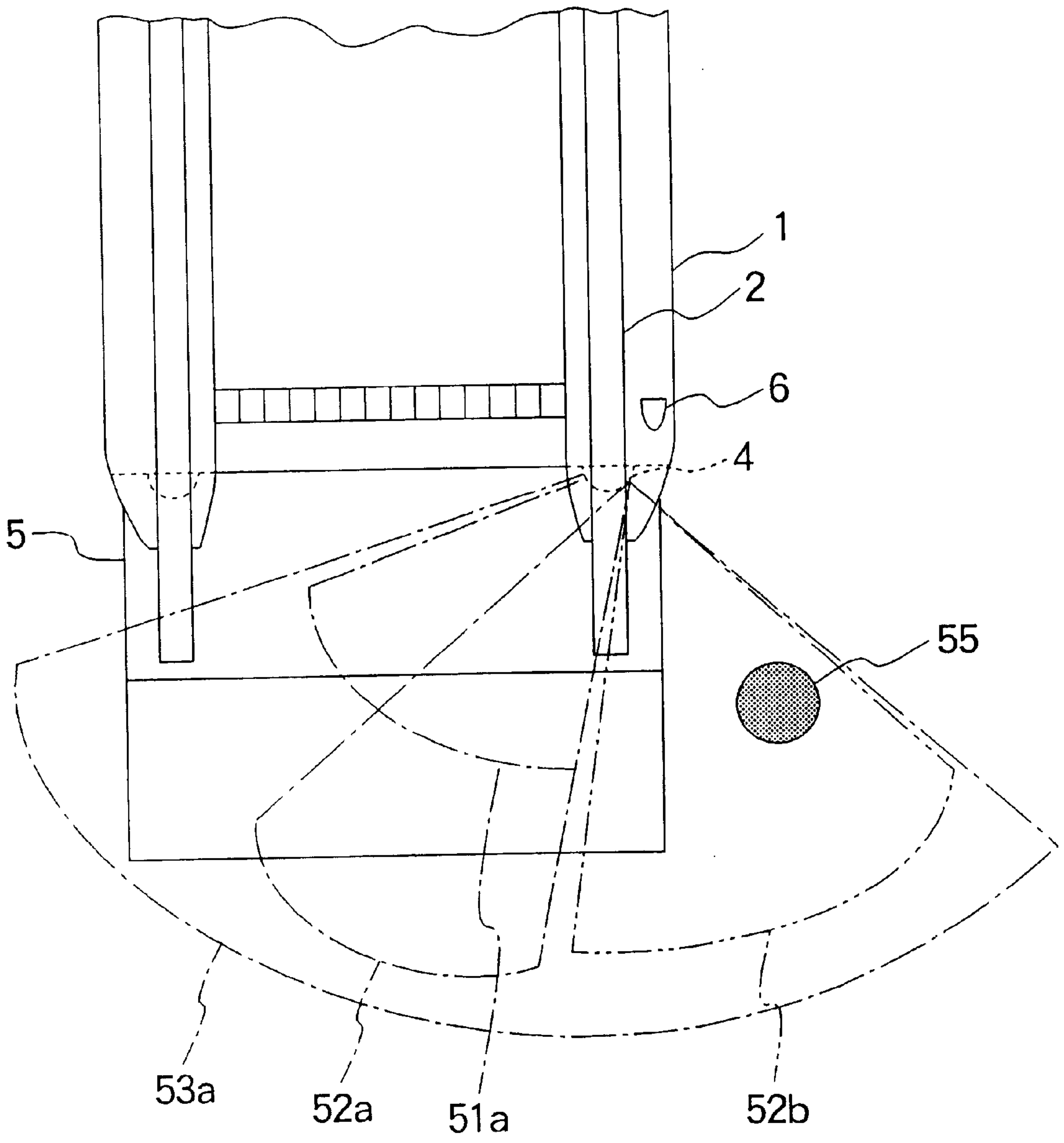
FIG. 13 is a plan view showing the passenger detecting device shown in FIG. 12.

FIG. 12 is a side elevational view showing passenger detecting devices for the passenger conveyor in accordance with Embodiment 6 of the present invention, and FIG. 13 is a plan view of the passenger detecting devices shown in FIG. 12. The passenger detecting devices 4 for detecting the presence/absence of passengers are provided in a lower portion of each handrail return port 3 of the balustrade 1. A reflective photo detection type sensor having first and second light emitting portions 51 and 52 and a light receiving portion 53 is used as each passenger detecting device 4.

Light projection ranges 51*a* and 52*a* by the first and second light emitting portions 51 and 52 are sector-shaped as viewed from above and have different light projection angles from each other so as not to intersect with each other as viewed in elevation. A light receiving range 53*a* of the light receiving portion 53 is sector-shaped as viewed from above and intersects with the light projection ranges 51*a* and 52*a* as viewed in elevation.

Accordingly, the intersecting portion (hatching in the drawing) between the light projection range 51*a* of the first light emitting portion 51 and the light receiving range 53*a* is the first zone (first detecting range) 41, and the intersecting portion (hatching in the drawing) between the light projection range 52*a* of the second light emitting portion 52 and the light receiving range 53*a* is the second zone (second detecting range) 42. Moreover, in FIG. 13, the light projection ranges 51*a* and 52*a* and the light receiving range 53*a* of one of the passenger detecting devices 4 are shown.

In such passenger detecting devices 4, infrared laser beams or the like are projected from the first and second light emitting portions 51 and 52. When the feet or the like of a passenger enters the first and second zones 41 and 42, the light beam reflected from the passenger is received in the light receiving portion 53 to thereby detect the passenger. At this time, if infrared beams having different respective frequencies are emitted from the first and second light emitting portions 51 and 52, it is possible to determine in which one of the first and second zones 41 and 42 the passenger was detected.

Also, by emitting the infrared beams at a different timing from each other in the form of pulses from the first and second light emitting portions 51 and 52, it is possible to determine in which one of the first and second zones 41 and 42 the passenger was detected.

According to such passenger detecting devices, it is possible to positively define the range for detecting the absence/presence of the passenger and it is easy to adjust of the detection range. Accordingly, the passenger detecting devices may be applied to the control apparatuses of the foregoing embodiments.

Moreover, in Embodiment 6, while two detection ranges are applied, it is possible to use a single light emitting portion and a single detection range or to use three or more light emitting portions and three or more detection ranges.

Here, for example, as indicated by two-dot-and-dash lines in FIG. 13, in the case where the light projection range 52*b* of the second light emitting portion 52 is largely expanded, there is a possibility that some article 55 such as a building protrusion, a plant pot or a rail could be included in the detection range. In such a case, the light receiving amount containing the light reflected from the article 55 is used as the reference value in advance. In the case where the light receiving amount abruptly increases from the reference value, it is assumed that a passenger has entered the detection range. Thus, it is possible to prevent erroneous detection by the light reflected from the article 55.

Figure 14:
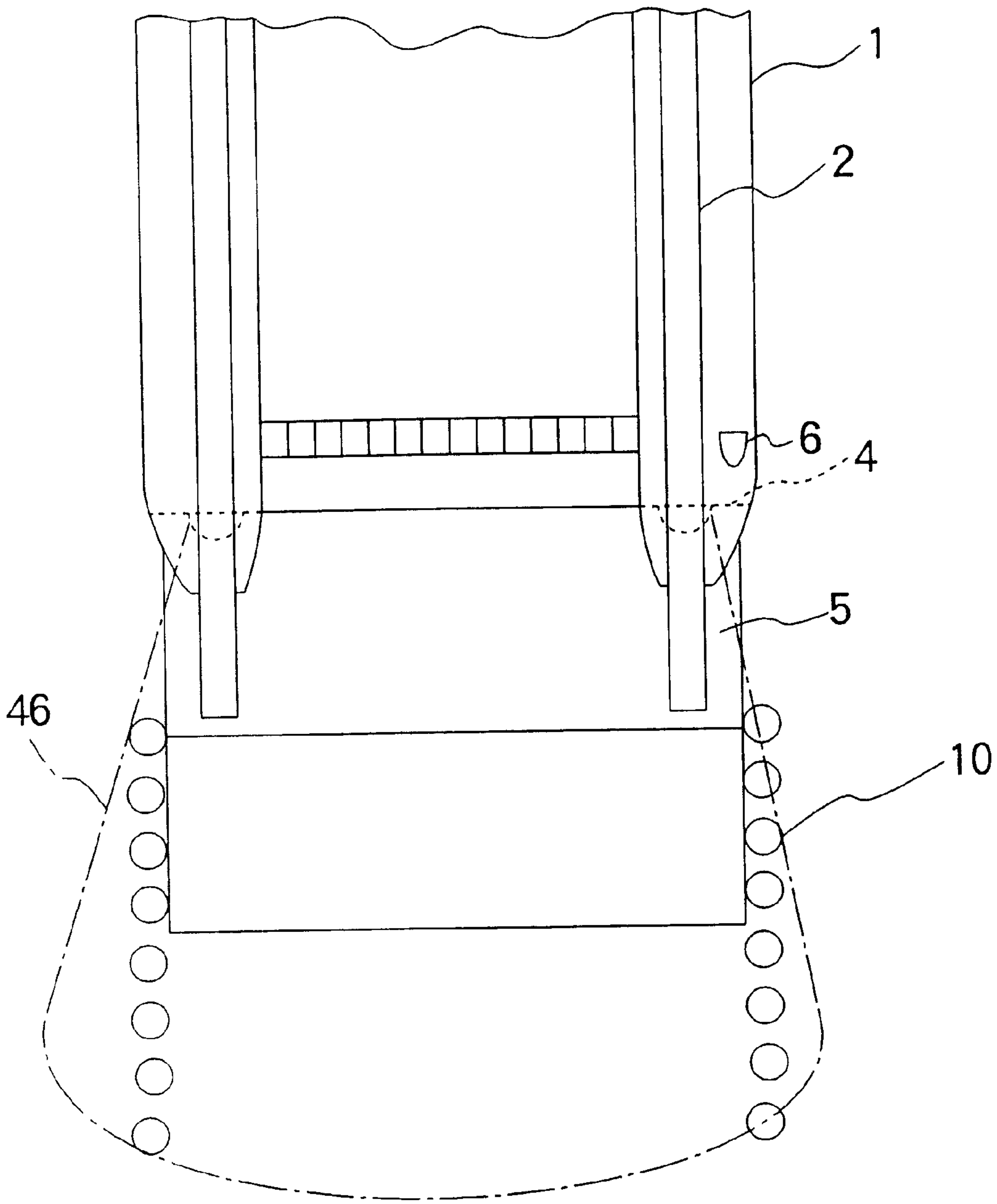
FIG. 14 is a plan view showing entrance/exit gates of a passenger conveyor provided with guide railings.

Also, in the case where the passenger detecting devices 4 are provided in the balustrade 1, if the guide railings 10 are provided at the entrance/exit gates as shown in FIG. 14, the railings 10 may be included within the detection range 46. However, in such a case, if the light receiving amount containing the light reflected from the guide railings 10 is used as the reference value in advance, it is possible to prevent erroneous detection caused by the guide railings 10.

What is claimed is:

1. A control apparatus for a passenger conveyor comprising:

a control apparatus body for controlling operation of a passenger conveyor in accordance with a plurality of operating modes including a standby mode for stopping operation and standing by, an intermediate mode switched from the standby mode, a conveying mode switched from the intermediate mode for conveying a passengers and an alarm mode for alerting a passenger who is about to enter from an exit gate side that the conveyor is operating in a direction opposite to entry of the passenger;

passenger detecting devices for distinguishing and monitoring the absence and presence of a passenger within first zones on an entrance gate side and the exit gate side, including floor boards of the entrance gate side and the exit gate side, and the absence and presence of a passenger within second zones on the entrance gate side and the exit gate side adjacent and beyond the first zones, covering the first zones, respectively; and a mode switching circuit switching the operating modes in response to information from said passenger detecting devices, wherein when a passenger is detected in at least one second zone on the entrance gate side and the exit gate side while the passenger conveyor is operating in the standby mode, said mode switching circuit switches the operating mode to the intermediate mode, when a passenger is detected in the first zone on the entrance gate side while the passenger conveyor is operating in the intermediate mode, said mode switching circuit switches the operating mode to the conveying mode, and when a passenger is detected in the first zone on the exit gate side while the passenger conveyor is operating in the intermediate mode, said switching mode switches the operating mode to the alarm mode.

2. The control apparatus for a passenger conveyor according to claim 1, wherein said passenger detecting devices include first sensors on the entrance gate side and on the exit gate side for detecting the absence and presence of a passenger in the respective first zones, and second sensors on the entrance gate side and on the exit gate side for detecting the absence and presence of a passenger in the respective second zones.

3. The control apparatus for a passenger conveyor according to claim 2, wherein said respective first sensors are input photo detection sensors having light emitting portions and light detecting portions facing each other.

4. The control apparatus for a passenger conveyor according to claim 1, wherein said control apparatus body operates the passenger conveyor in the intermediate mode at a lower speed than in the conveying mode.

5. The control apparatus for a passenger conveyor according to claim 4, wherein said passenger detecting devices divide the second zone on the entrance gate side into a plurality of sub-zones with different distances from an entrance gate and monitor the absence and presence of a passenger, and when a passenger is detected in the respective sub-zones, the operating speed of the passenger conveyor becomes closer to the operating speed in the conveying mode the closer the sub-zone is to said entrance gate.

6. The control apparatus for a passenger conveyor according to claim 1, wherein when no passenger is detected in the first and second zones for a set time period while the passenger conveyor is operating in the intermediate mode, said mode switching circuit switches the operating mode to the standby mode.

7. The control apparatus for a passenger conveyor according to claim 1, wherein the respective second zones include regions outside of handrail returning portions on both sides of the passenger conveyor so that a passenger who detours around the entrance and exit gates from outside of the handrail returning portions may be detected.

8. The control apparatus for a passenger conveyor according to claim 1, including alarm means for generating an alarm in the alarm mode, located on both of the entrance gate side and the exit gate side, wherein control on the entrance gate side and control on the exit gate side may be automatically interchanged with each other in response to switching of operating directions of the passenger conveyor.

9. A control apparatus for a passenger conveyor comprising:

a control apparatus body for controlling operation of a passenger conveyor in accordance with a plurality of operating modes including a conveying mode for conveying a passenger, a standby mode for stopping operation and standing by, an intermediate mode switched from the standby mode, and an alarm mode for alerting a passenger who is about to enter from an exit gate side that the conveyor is operating in a direction opposite to entry of the passenger;

a passenger detecting device for distinguishing and monitoring absence and presence of a passenger within a first zone including a floor board of the exit gate side, and the absence and presence of a passenger within a second zone adjacent and beyond the first zone, covering the first zone; and a mode switching circuit switching the operating mode from the standby mode to the intermediate mode when a passenger is detected in the second zone, and from the intermediate mode to the alarm mode when a passenger is detected in the first zone.

10. The control apparatus for a passenger conveyor according to claim 9, wherein said passenger detecting device includes a first sensor for detecting the absence and presence of a passenger in the first zone, and a second sensor for detecting the absence and presence of a passenger in the second zone.

11. The control apparatus for a passenger conveyor according to claim 9, wherein said control apparatus body operates the passenger conveyor in the intermediate mode at a lower speed than in the conveying mode.

12. The control apparatus for a passenger conveyor according to claim 9, wherein when a passenger is not detected in the first and second zones for a set time period from starting of the intermediate mode, said mode switching circuit switches the operating mode to the standby mode.

13. The control apparatus for a passenger conveyor according to claim 9, wherein the second zone includes regions outside of handrail returning portions on both sides of the passenger conveyor so that a passenger who detours around an exit gate from outside of the handrail returning portions may be detected.

14. The control apparatus for a passenger conveyor according to claim 1, wherein said passenger detecting devices include a light emitter and a light detector disposed in a balustrade portion of entrance and exit gates of the passenger conveyor, a light projection range of said light emitter and a light detection range of said light detector are sector-shaped as viewed from above, respectively, and angles in an up-and-down direction of the light projection range and the light detection range are different so that an intersection of the light projection range and the light detection range establishes a passenger detection range at which a passenger is detected.

* * * * *